(12) United States Patent
Bedrosian

(10) Patent No.: US 7,778,171 B2
(45) Date of Patent: Aug. 17, 2010

(54) CONNECTIONLESS CONFIGURATIONS FOR STRESS TESTING TIMING AND SYNCHRONIZATION IN DATA PACKET NETWORKS

(75) Inventor: Paul Stephan Bedrosian, Andover, MA (US)

(73) Assignee: Agere Systems Inc., Allentown, PA (US)

( * ) Notice: Subject to any disclaimer, the term of this patent is extended or adjusted under 35 U.S.C. 154(b) by 266 days.

(21) Appl. No.: 12/074,155

(22) Filed: Feb. 29, 2008

(65) Prior Publication Data

US 2008/0219175 A1  Sep. 11, 2008

Related U.S. Application Data

(60) Provisional application No. 60/904,652, filed on Mar. 2, 2007.

(51) Int. Cl.
*H04J 1/16* (2006.01)
(52) U.S. Cl. ........................ 370/230; 370/250
(58) Field of Classification Search ............... 370/230, 370/230.1, 235, 392, 250
See application file for complete search history.

(56) References Cited

U.S. PATENT DOCUMENTS

| | | | |
|---|---|---|---|
| 6,442,166 B1 * | 8/2002 | McDonald et al. | 370/395.42 |
| 6,571,358 B1 * | 5/2003 | Culotta et al. | 714/33 |
| 7,191,355 B1 * | 3/2007 | Ouellette et al. | 713/400 |
| 7,418,147 B2 | 8/2008 | Kamaci | |
| 7,492,732 B2 * | 2/2009 | Aweya et al. | 370/321 |
| 2003/0091047 A1 | 5/2003 | Pate et al. | |
| 2006/0165003 A1 * | 7/2006 | Partridge | 370/248 |
| 2006/0193400 A1 | 8/2006 | Morris et al. | |
| 2008/0080563 A1 | 4/2008 | Kataria et al. | |
| 2008/0262991 A1 * | 10/2008 | Kapoor et al. | 706/20 |
| 2009/0268783 A1 | 10/2009 | Karabinis | |

OTHER PUBLICATIONS

"Timing and Synchronization Aspects in Packet Networks", ITU-T Recommendation G.8261/Y.1361 (May 2006).
"Ethernet Network Emulators: GEM,XGEM", High Performance Precision Emulators, Anue Systems, Inc. (Nov. 2007).
S. Kaczmarek, et al., "Methods for Evaluation Packet Delay Distribution of Flows Using Expedited Forwarding PHB", Journal of Telecomm. & Information Technology (Feb. 2004).

* cited by examiner

*Primary Examiner*—Jason E Mattis
*Assistant Examiner*—Dady Chery

(57) ABSTRACT

A method and system for providing connectionless configurations for stress testing timing and synchronization in data packet networks. Packet traffic of interest is transmitted through multiple interconnected switching nodes such that different packets can be transmitted over different paths through the switching nodes. The nodes can support background traffic in order to generate delays for the packets at each of the switching nodes. By allowing packets to use multiple paths in a single testing configuration, a connectionless packet flow can be utilized for adaptive packet timing recovery stress testing.

21 Claims, 7 Drawing Sheets

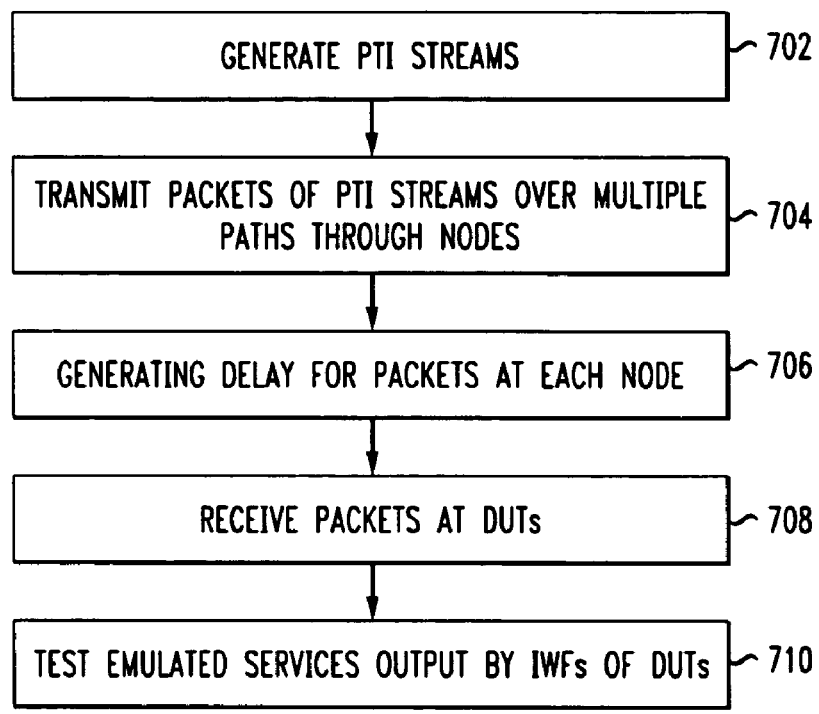
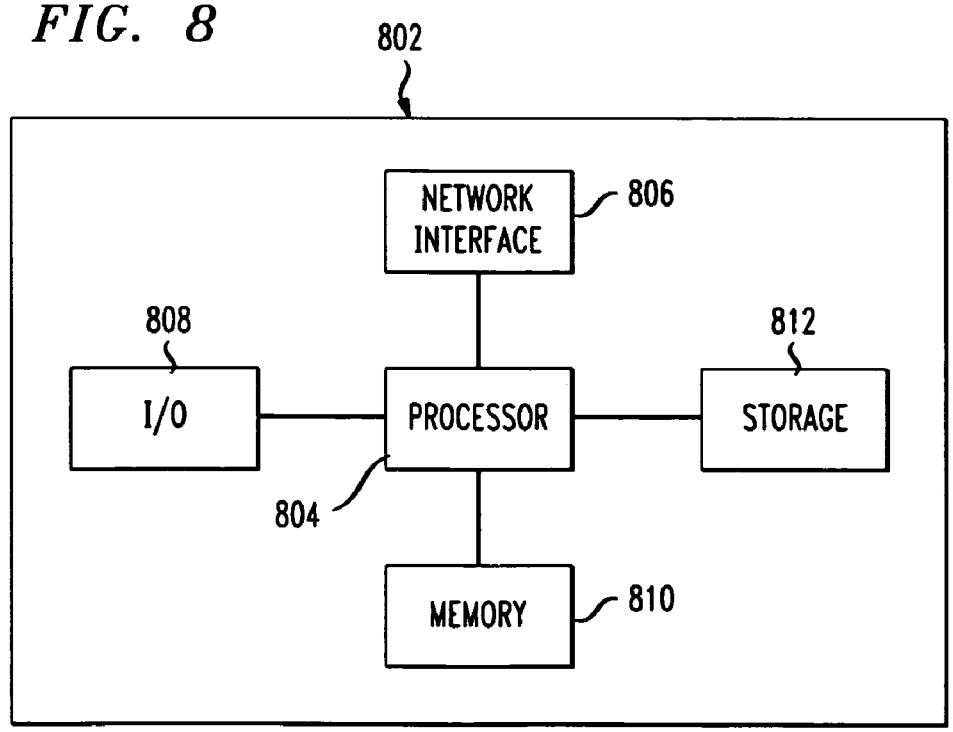

CONNECTIONLESS CONFIGURATIONS FOR STRESS TESTING TIMING AND SYNCHRONIZATION IN DATA PACKET NETWORKS

This application claims the benefit of U.S. Provisional Application No. 60/904,652, filed Mar. 2, 2007, the disclosure of which is herein incorporated by reference

BACKGROUND OF THE INVENTION

The present invention relates generally to stress testing timing and synchronization in data packet networks, and more particularly to connectionless configurations for stress testing.

An ongoing development in telecommunications is the convergence of voice, video, and data into a common stream. This requires migrating services typically delivered using a circuit network, such as telephony, to a packet based network. However, in a packet based network, synchronization of such services is difficult because there is no longer a precise network clock traceable signal as in a circuit switched network. The network traceable clock is used to recover the service clock of these circuit switched services (e.g., DS1, E1) to ensure error free-transmission. Circuit switched networks rely on the physical layer to transport these network clock signals between network elements to form a timing chain. The accuracy of these physical layer clock signals are typically synchronized to an accuracy of ±4.6 ppm or better. However, in packet networks, the clock signals used at the physical layer do not form a timing chain but are controlled by local free-running oscillators. Further, the accuracy of physical layer transport clock is synchronized to an accuracy of ±100 ppm Therefore, the physical layer clock signals in a packet network are not sufficient to support the error-free transport of circuit switched services over a packet network, commonly called circuit emulation. As a result, other methods must be used to recovery the service clock of circuit emulation services. The method of adaptive timing recovery typically relies on the arrival characteristics of packets as a basis to create a suitable service clock for circuit emulation.

ITU-T Recommendation G.8261—Timing and Synchronization in Packet Networks includes recommendations for testing methodology for testing circuit emulation and adaptive packet timing recovery. FIG. 1 illustrates conventional testing methodology described in G.8261 for testing adaptive packet timing recovery. As illustrated in FIG. 1, a packet-based equipment clock (PEC) server 102 generates a stream of packets referred to as the packet traffic of interest (PTI). An interworking function IWF of the PEC server 102 can generate the PTI by converting time division multiplex (TDM) traffic to packets. TDM traffic generally refers to asynchronous bit streams used in telephony networks (e.g., DS1, E1). The PTI is transmitted through Ethernet switches 104, 106, 108, and 110, to a device under test (DUT) 122, which is a PEC client. An IWF of the DUT 122 converts the PTI to a TDM signal to provide an emulated service. Background traffic generated by a traffic generators 120 and 114 are added to the PTI at each of the Ethernet switches 104, 106, 108, and 110 in order to generate delay variation (PDV) in the PTI. Testing equipment 116 is used to test the PDV generated in the PTI based on a reference timing signal 124, or primary reference clock (PRC), used to represent the TDM service clock. Testing equipment 118 is used to test jitter, wander (MTIE), phase deviation (TDEV, minTDEV), and frequency accuracy of the TDM signal output from the DUT 122.

As illustrated in FIG. 1, the current methodology described in G.8261 is based on connection-oriented topologies which ensure that the test traffic follows the same path, and therefore, is delivered in proper order. In addition, the delay distributions of such a configuration will tend to be statistically stable and allow timing recovery algorithms based on the central limit theorem to be used. Since these conditions do not reflect true network stresses or transient events, they will do little more than provide proof-of-concept of basic timing recovery operation. The focus of stress testing should be based on subjecting packet traffic of interest (PTI) to a series of controlled tests that impart a known stimulus for a specified duration with an expected result. The testing stimulus should be based on events that reflect stresses found in a real network. Stress conditions are not reflective of typical, or non-fault network conditions. Therefore, a testing methodology that supports both connectionless and connection-oriented networks is needed to provide a suitable stress testing environment.

BRIEF SUMMARY OF THE INVENTION

The present invention provides a method and system for timing and synchronization stress testing in data packet networks. According to embodiments of the present invention, configurations are provided that support stress testing that simulates connectionless networks.

In one embodiment of the present invention, packet generators generate packet traffic of interest (PTI) streams. The packet generators can be implemented as interworking functions. A group of interconnected packet switching nodes transmit packets of the PTI streams from the packet generators and to devices under test. The nodes are interconnected by multiple links that provide multiple paths through the nodes. Different packets in PTI stream can be transmitted through the nodes over different paths. Each of the nodes generates delays for packets that are routed through that node. The delays can be generated at each node by generating background traffic at each node. The background traffic can be controlled independently for each node.

These and other advantages of the invention will be apparent to those of ordinary skill in the art by reference to the following detailed description and the accompanying drawings.

BRIEF DESCRIPTION OF THE DRAWINGS

FIG. 7 illustrates a method for adaptive timing recovery stress testing according to an embodiment of the present invention; and FIG. 8 illustrates a high level block diagram of a computer capable of implementing embodiments of the present invention.

DETAILED DESCRIPTION

The present invention is directed to stress testing of timing and synchronization in packet networks. For example, embodiments of the present invention are directed to circuit emulation and adaptive packet timing recovery stress testing. The focus of stress testing should be based on subjecting packet traffic of interest (PTI) to a series of controlled tests that impart a known stimulus for a specified duration with an expected result. The testing stimulus should be based on events that reflect stresses found in a real network.

In the case of timing recovery algorithms based on layer 2 and higher protocols, a number of impairments, such as packet delay and packet delay variation (PDV), will have a great influence on the ability of these protocols to work properly. Packet delay is the overall delay with respect to the time a packet was sent to the time the packet is received. Although the overall packet delay is important in terms of supporting services with strict delay requirements, the packet-to-packet delay characteristics are important for preserving the service timing characteristics of a circuit emulation service (CES) or timing emulation service (TES) or packet network timing (PNT) flow. PDV, also referred to as IP packet delay variation (IPDV), refers to packet-to-packet delay characteristics of a packet stream of interest. PDV characteristics can be described in terms of step changes between consecutive packets, overall delay variation of a population of packets, and statistical trends.

Figure 2:
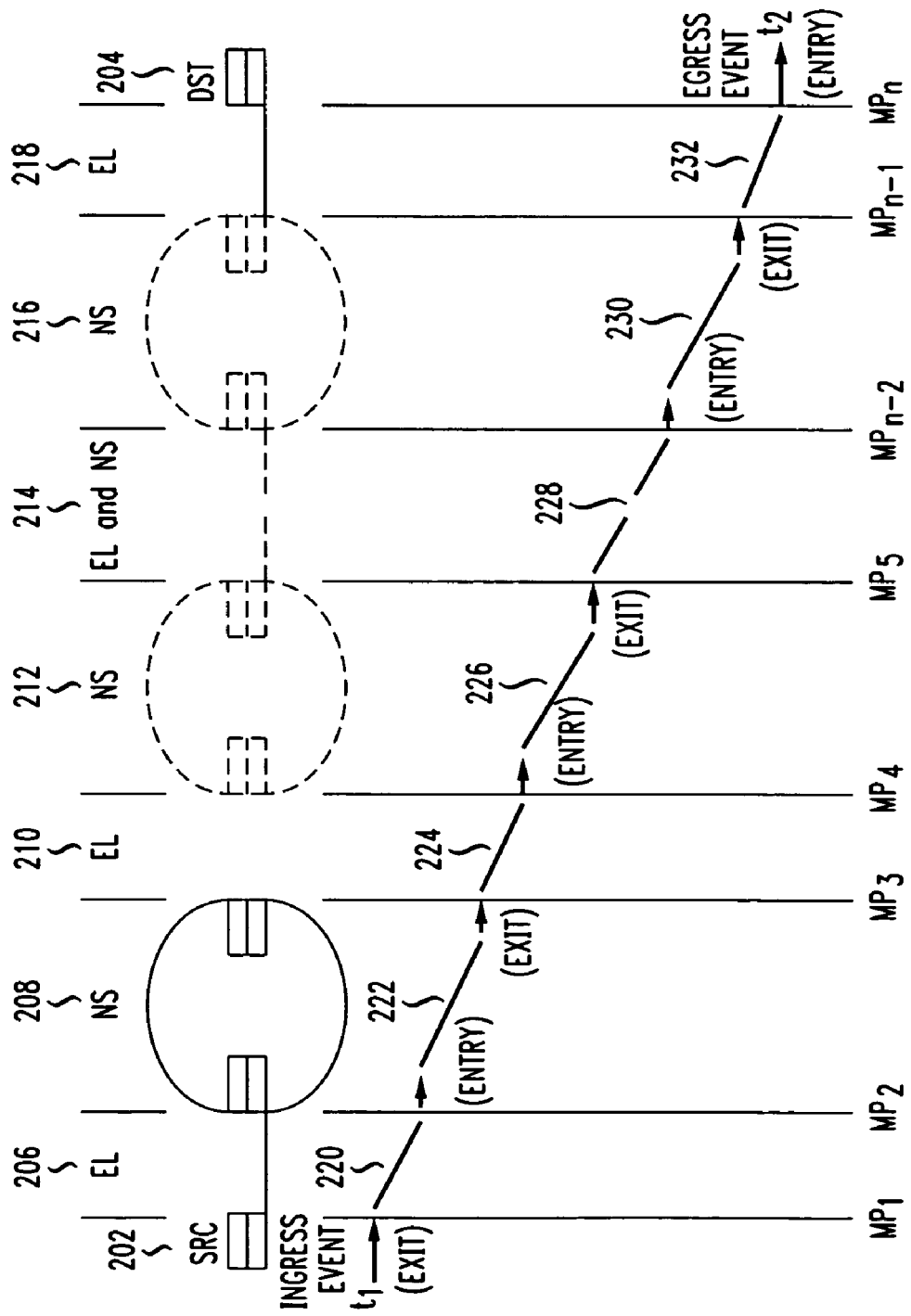
FIG. 2 illustrates delay of a data packet as the packet is transferred.

The actual packet and delay variations are dependent on a number of factors related to the packet size, priority, physical path, state of intermediate nodes, and background traffic. FIG. 2 illustrates delay of a data packet as the packet is transferred from a source 202 to a destination 204. As illustrated in FIG. 2, a data packet experiences delays 220-232 from a number of sources in its journey from the source (SRC) 202 to the destination (DST) 204. Exchange links (EL) 206, 210, and 218 impart a relatively fixed delay, and network sections (NS) 208, 212, and 216 impart a variable delay based on a number of factors that tend to change on a packet by packet basis. The NS sections 208, 212, and 216 are packet networks that include a "packet switching cloud" which does not guarantee that all packets will follow the same path through an NS section. Reference numeral 214 refers to section that includes both EL and NS. The transfer of the packet through each EL or NS section creates a delay event that adds to the delay for that packet. FIG. 2 shows the delay 220, 222, 224, 226, 228, 230, and 232 generated by EL 206, NS 208, EL 210, NS 212, EL and NS 214, NS 216, and EL 218, respectively. The delays 220-232 cumulatively determine the total delay, which is the difference between a time (t2) of the egress event at which the packet exits the network at DST 204 and a time (t1) of the ingress event when the packet enters the network from SRC 202.

Figure 1:
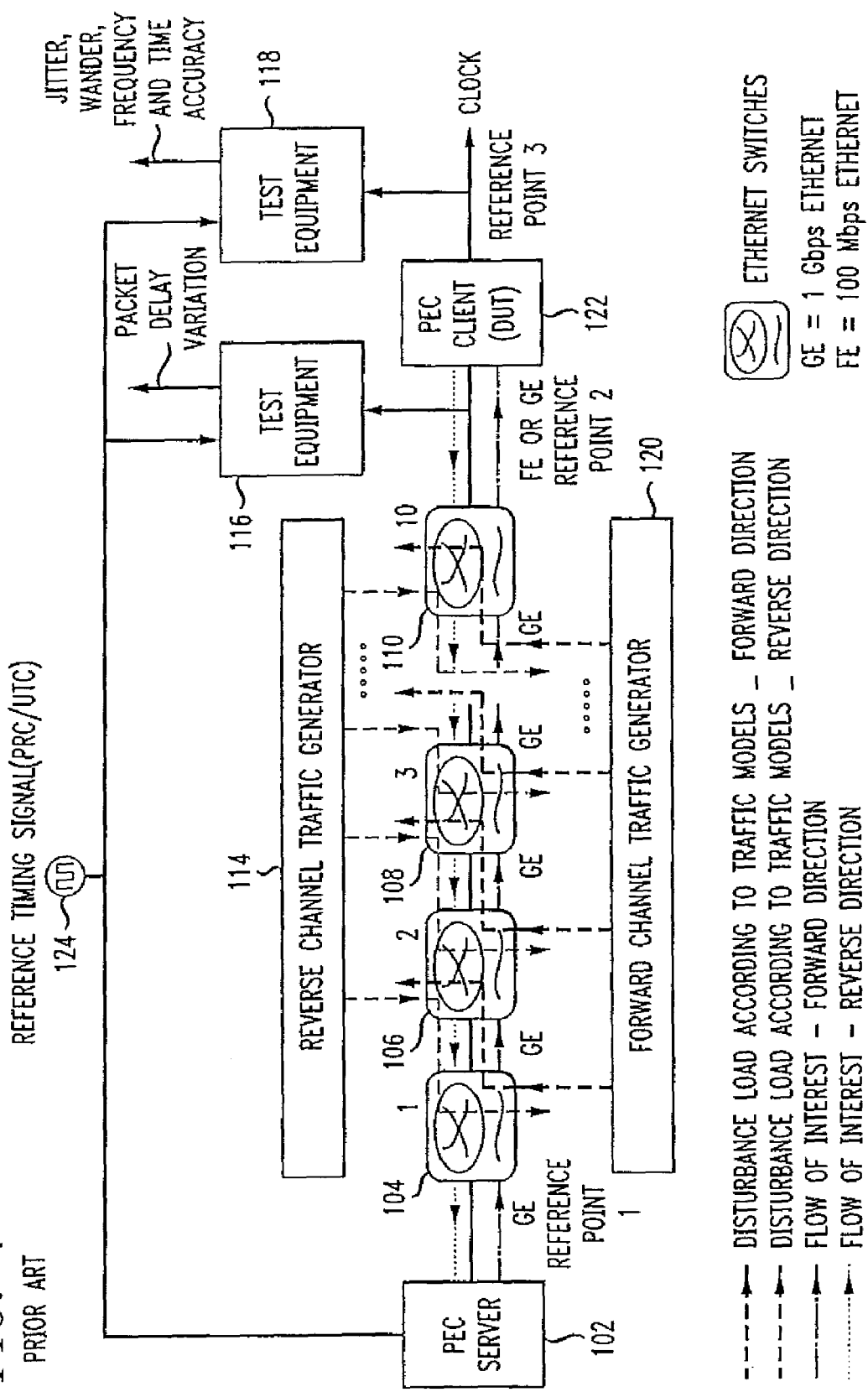
FIG. 1 illustrates conventional testing methodology for adaptive packet timing recovery.

There are significant differences with the model shown in FIG. 2 and the conventional G.8261 testing configuration of FIG. 1. The convention G.8261 testing configuration of FIG. 1 restricts the packet traffic of interest (PTI) to follow the same path. Such an arrangement typically results in packets being received in order, and can be referred to as "connection-oriented". A connection-oriented testing configuration typically results in a Gaussian PDV probability density function (PDF) for a constant mix of background traffic. Much of the testing methodology described with the conventional G.8261 configuration shown in FIG. 1 relies on maintaining a fixed traffic mix for a significant amount of time (e.g., one or more hours). This tends to favor packet timing algorithms that are based on the central limit theorem, thus not tolerant of stress conditions. Accordingly, the conventional configuration of FIG. 1 does not provide a suitable stress testing environment.

Figure 3:
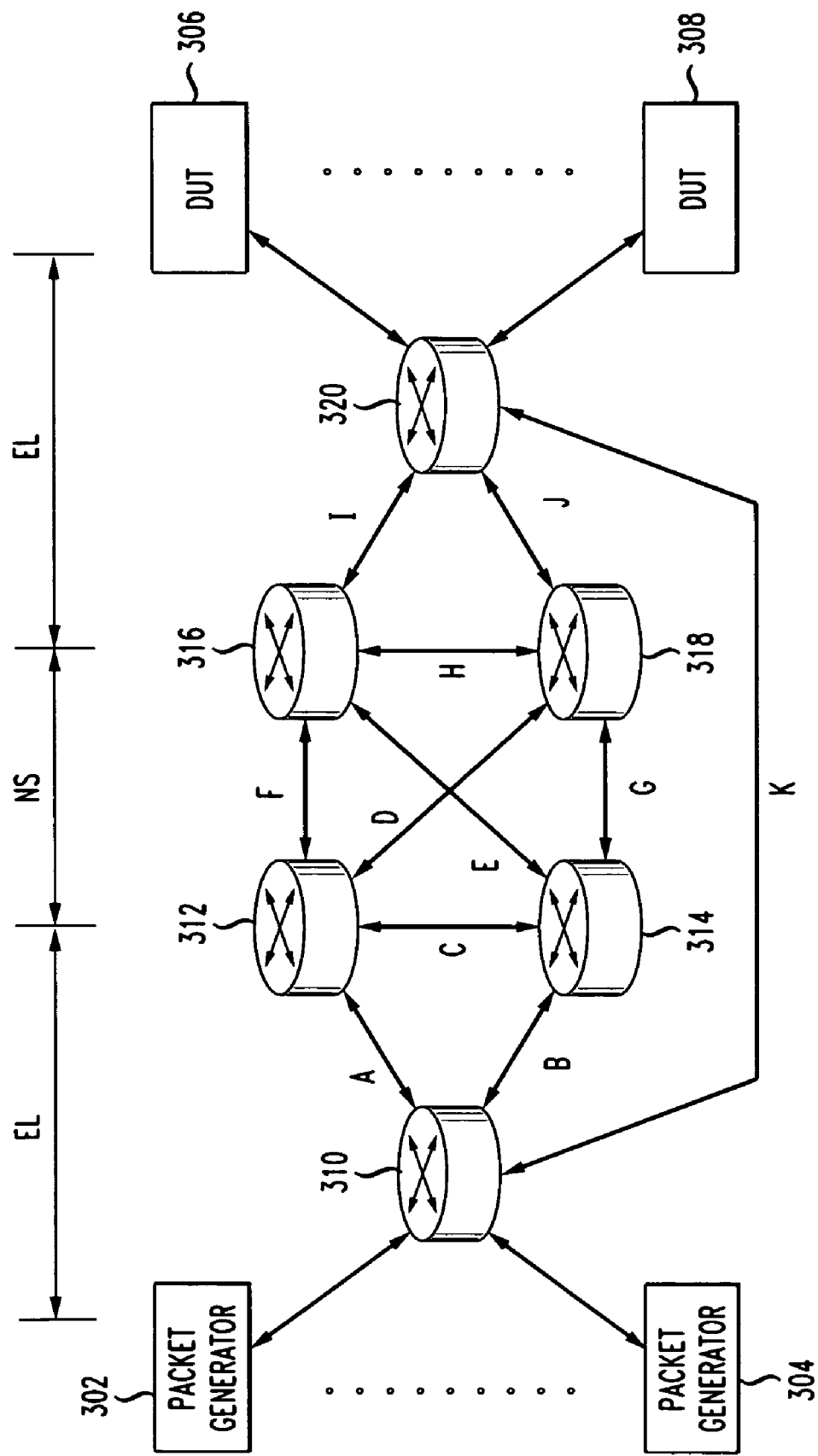
FIG. 3 illustrates a connectionless stress testing system according to an embodiment of the present invention.

FIG. 3 illustrates a connectionless stress testing system according to an embodiment of the present invention. As illustrate in FIG. 3, a testing configuration includes multiple nodes 310, 312, 314, 316, 318, and 320. The nodes 310, 312, 314, 316, 318, and 320 can be implemented as packet switches or routers. The nodes 310, 312, 314, 316, 318, and 320 are connected by links A, B, C, D, E, F, G, H, I, J, and K. One or more packet generators 302 and 304 are connected to node 310, and one or more devices under test (DUT) 306 and 308 are connected to node 320. Nodes 312, 314, 316, and 318 and links C-H provide multiple possible paths between node 310 and node 320. Link K provides a direct link, or cut through, between node 310 and node 320. In order to provide stress testing, packet traffic of interest (PTI) is generated by the packet generators 302 and 304. The PTI is streams of data packets generated by a packet generator 302 or 304 and destined for a device under test 306 or 308. Each of the nodes 310, 312, 314, 316, 318, and 320 can generate background traffic to generate delay and PDV for the streams of PTI.

The test configuration shown in FIG. 3 supports flexibility by providing multiple paths for one or more streams of PTI (generated by the one or more packet generators 302 and 304). By allowing multiple paths to be used in a single testing configuration, a connectionless oriented packet flow may be created which more closely mirrors the traffic flow in a real network. In addition to selecting different paths, the PDV characteristics at each node 310, 312, 314, 316, 318, and 320 may also be controlled, thus allowing the robustness of a packet timing recovery algorithm to be evaluated.

In terms of the routing flexibility of this test configuration of FIG. 3, there are 13 possible unique paths between node 1 to node 6 without using the same node twice. Table 1 lists these possible paths:

TABLE 1

| Path | Links | Nodes |
| --- | --- | --- |
| 1 | K | 310, 320 |
| 2 | A, F, I | 310, 312, 316, 320 |
| 3 | B, G, J | 310, 314, 318, 320 |
| 4 | A, D, J | 310, 312, 318, 320 |
| 5 | B, E, I | 310, 314, 316, 320 |
| 6 | B, C, F, I | 310, 314, 312, 316, 320 |
| 7 | A, C, G, J | 310, 312, 314, 318, 320 |
| 8 | A, C, E, I | 310, 312, 314, 316, 320 |
| 9 | B, C, D, J | 310, 314, 312, 318, 320 |
| 10 | A, C, E, H, J | 310, 312, 314, 316, 318, 320 |
| 11 | B, C, D, H, I | 310, 314, 312, 318, 316, 320 |
| 12 | A, C, G, H, I | 310, 312, 314, 318, 316, 320 |
| 13 | B, C, F, H, J | 310, 314, 312, 316, 318, 320 |

It should be noted, that paths may also be constructed where links and nodes are used two or more times to establish complex networks. In such cases, there will be many more test paths that may be used. An example of where multiple paths/nodes would be used is and IEEE 1588 two-way adaptive timing system. In this example, there would be two PTI flows. One path from the master to slave and the other path from slave to master. In some cases, it may be desirable to make these paths the inverse of each other (e.g., master to slave=A, F, I and slave to master=I, F, A).

The testing topology of FIG. 3 reflects all of the basic elements of the model of FIG. 1. Note that the EL and NS sections are identified in FIG. 3. Nodes 310 and 320 represent the EL sections that allow one or more packet generator sources 302 and 304 to be used. In addition one or more DUTs 306 and 308 can be used simultaneously to measure robust operation. The NS "core" of the system of FIG. 3 is comprised of four fully interconnected switching nodes (312, 314, 316, and 318). Each of these nodes 312, 314, 316, and 318 will not only carry the PTI, but also support additional background traffic that can be fully defined at each node.

As illustrated in FIG. 3, according to an embodiment of the present invention, the testing configuration includes redundant access links. Links A and B support node 310 and links I and J support node 320. Therefore, timing recovery performance in the presence of EL protection switching events may be evaluated independently of switching that occurs in NS section.

There may be cases where the NS section needs to be bypassed. This need could arise in order to isolate the switching network in an attempt to validate the test configuration or to simply provide test results for an EL application only. For these cases, Link K supports a connection directly between Nodes 1 and 7.

The NS section (nodes 312, 314, 316, and 318) supports any-to-any switching topology that allows not only paths to change, but delay and delay variation as well. Though connections between nodes 312, 314, 316, and 318 are shown as simple links, the delay of these paths could be made large due to large spools of cable or the use of delay lines. In addition, the latency or switch residence time of each packet would be influenced by the parameters of each switch node 312, 314, 316, and 318 (e.g., priority, queuing, and congestion) in addition to background traffic specified on a per switch basis.

As described above, the configuration of FIG. 3 can provide connectionless testing in which each packet of a PTI stream can follow a different path between node 310 and node 320. This configuration can also be used to implement connection-oriented testing, in which each packet of a PTI stream is controlled to use the same path between node 310 and node 320. A user can control all specifications of the testing, such as the nodes, paths, and loading used to transmit the PTI. Furthermore, each node 310, 312, 314, 316, 318, and 320, can generate delay independent of the other nodes based on user specifications, and each packet is loaded and delayed independently by a given node. The nodes 310, 312, 314, 316, 318, and 320 can delay the packets by adding background traffic or by generating PDV using a delay-step method.

Figure 4:
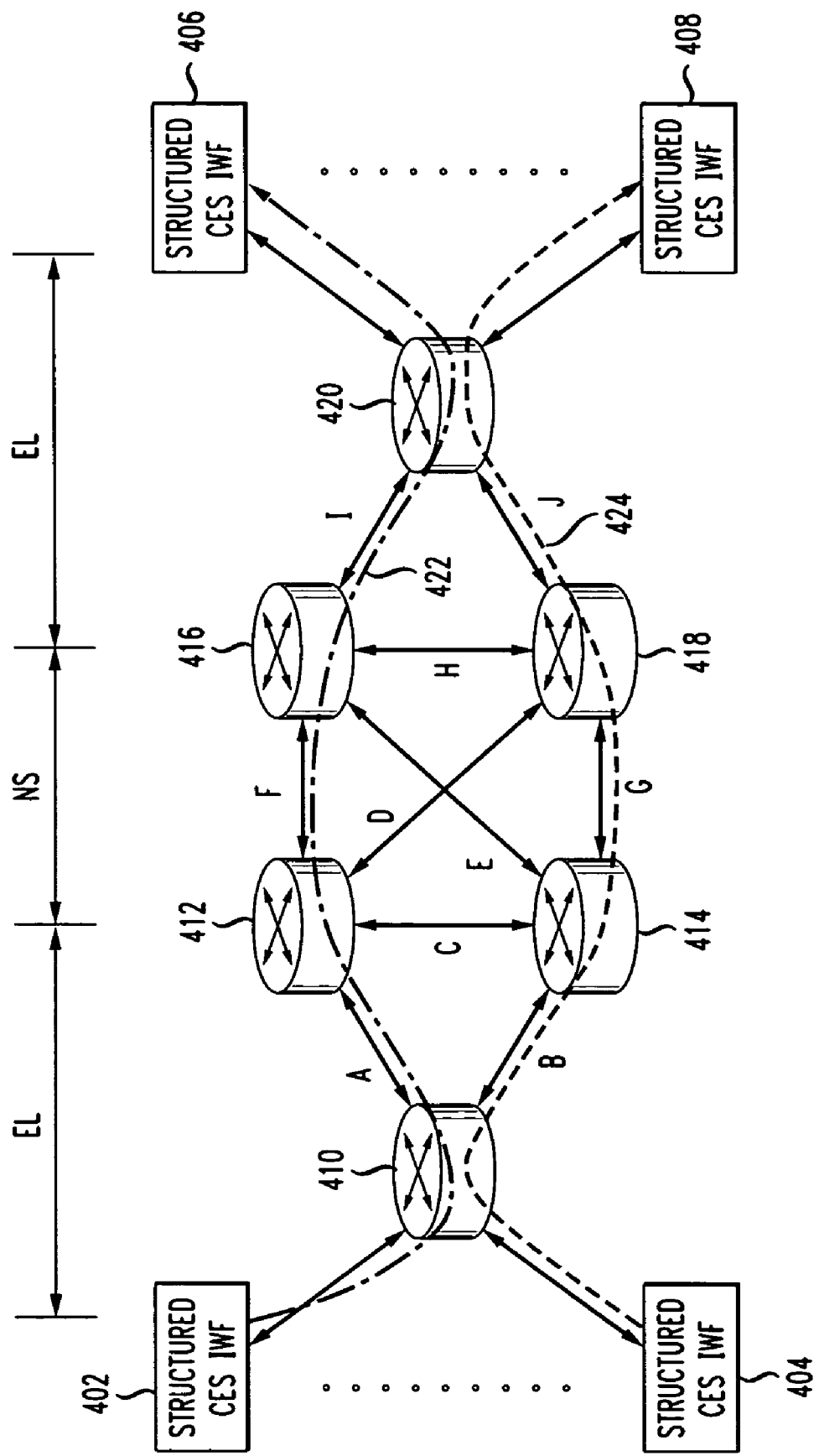
FIG. 4 illustrates a structured circuit emulation service (CES) stress testing configuration according to an embodiment of the present invention.
Figure 5:
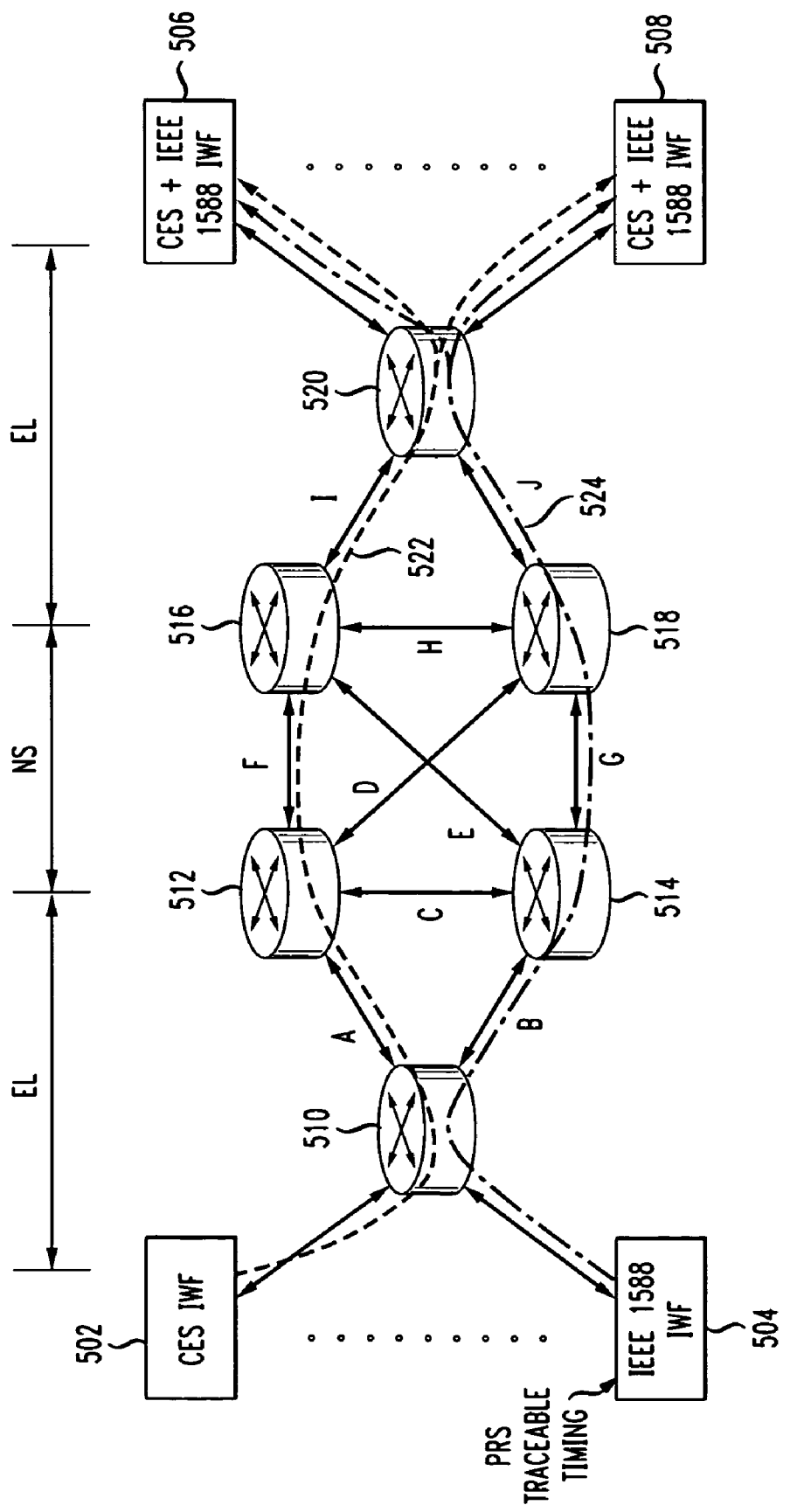
FIG. 5 illustrates timing emulation service (TES)/packet network timing (PNT) and CES testing configuration according to an embodiment of the present invention.
Figure 6:
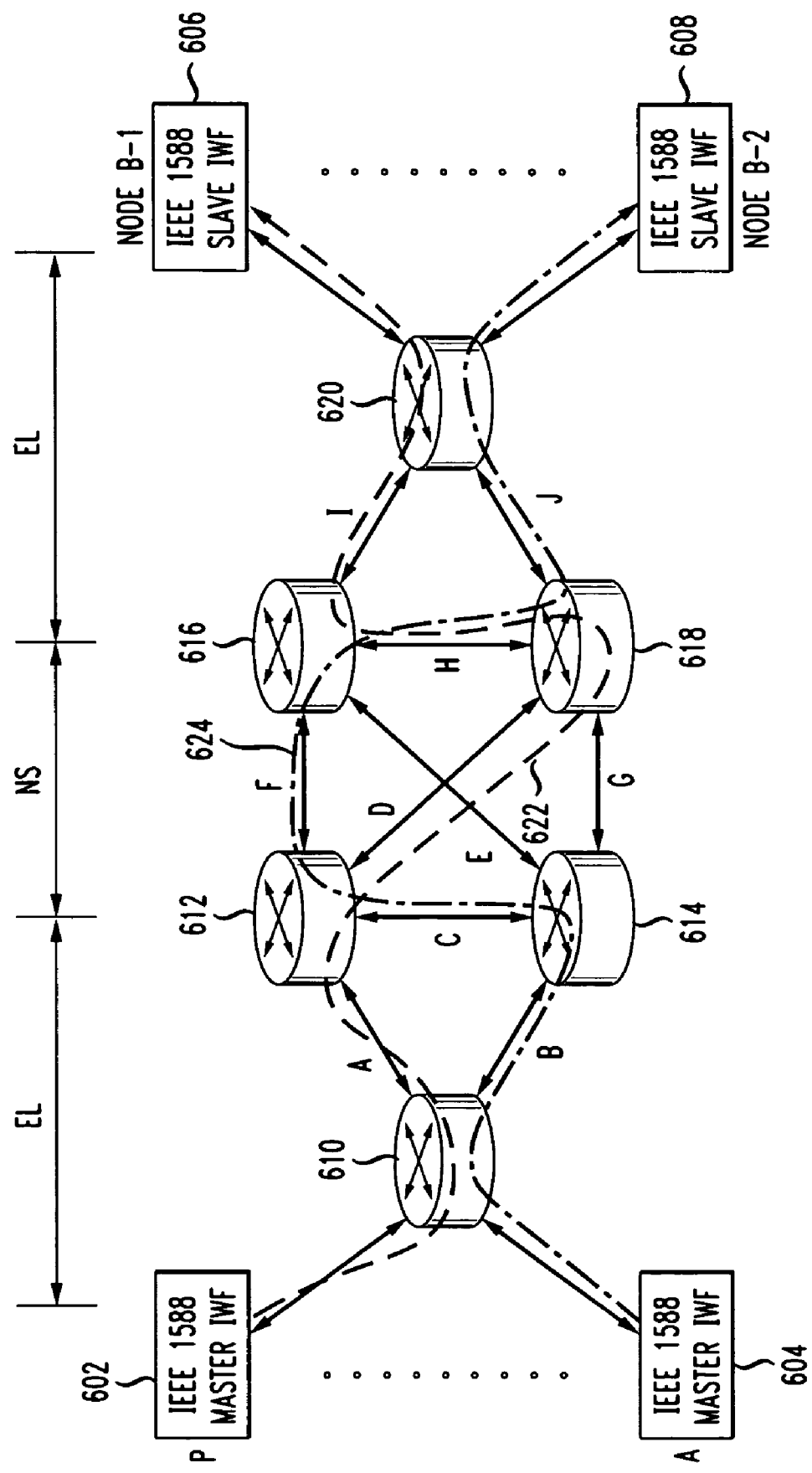
FIG. 6 illustrates a testing configuration for providing TES/PNT support of Universal Mobile Telecommunications System (UMTS)

FIGS. 4-6 are directed to testing configurations according to various embodiments of the present invention. The systems of FIGS. 4-6 are similar to the system of FIG. 3, and similar system components (nodes, links, etc.) perform similarly as described in FIG. 3.

FIG. 4 illustrates a structured circuit emulation service (CES) stress testing configuration according to an embodiment of the present invention. Structured CES testing may involve the circuit emulation of specific DS0s (Digital Signal Level 0) at ingress interworking functions (IWFs) to be mapped across a packet switching network (PSN) to specific egress IWFs. In the case where a single ingress IWF at a single node is mapped to an egress IWF at a different node, a point-to-point configuration would be needed. In the case where the ingress IWF is at a single node and the egress IWFs are at multiple nodes, a point-to-multipoint configuration would be needed to evaluate performance. In the case where multiple ingress IWFs and egress IWFs are used, a multipoint-to-multipoint configuration would be required. All of the above cases may be supported in the test configuration shown in FIG. 4. As illustrated in FIG. 4, structured CES IWFs 402 and 404 (ingress IWFs) send DS0s 422 and 424 to structured CES IWFs 406 and 408, respectively, via nodes 410, 412, 414, 416, 418, and 420. More particularly, IWF 402 sends DS0 422 to IWF 406 via nodes 410, 412, 416, and 420 and links A, F, and I, and IWF 404 sends DS0 424 to IWF 408 via nodes 410, 414, 418, and 420 and links A, G, J.

Since the timing requirements of DS0 cross-connection are strict, the configuration of FIG. 4 can be used to determine timing recovery performance at the egress IWFs 406 and 408 in the presence of PDV. PDV can be generated as a result of specified background traffic at each node 410, 412, 414, 416, 418, and 420, that are programmed with a deterministic delay profile (e.g., specific packet scheduling). In addition to packet delay, other connectionless impairments can be tested including intermediate switch faults and protection switching, out-of-order packet, and lost packets.

FIG. 5 illustrates TES/PNT and CES testing configuration according to an embodiment of the present invention. There may be cases where a common clock required for CES differential timing is emulated along the same or different paths via a TES/PNT packet stream. In such cases, there can be two PTI streams that would be affected by packet network impairments including PDV. In the case where each PTI follow the same path, it is expected that the probability density function (PDF) of the PDV of each PTI stream would have a similar mean delays and standard deviations. In the case where each PTI stream follows a different path, the delay and PDV can be made different for the different PTI streams.

The test configuration shown in FIG. 5 is an example of how IEEE 1588 may be used to support the differential timing requirements of a CES IWF. IEEE 1588 refers to a standard used for synchronizing time across packet networks. The CES PTI 522 is generated by CES IWF 402 and sent to CES and IEE 1588 IWFs 506 and 508 over the network on links (A, F, and I) using nodes (510, 512, 516, and 520). Likewise, the TES PTI, which provides primary reference signal (PRS) timing, is generated by IEE 1588 IWF 504 and sent to CES and IEEE 1588 IWFs 506 and 508 over the network on links (B, C, and J) using nodes (510, 514, 518, and 520). Background traffic or specific delay profiles may then be applied to each intermediate node to generate the desired PDV PDF. The timing recovery process as well as other transport specific metrics (e.g., bit error ratio (BER)) can then be evaluated.

FIG. 6 illustrates a testing configuration for providing TES/PNT support of Universal Mobile Telecommunications System (UMTS). There may be cases where a single TES/PNT packet stream must serve multiple locations. In the case of UMTS 3G timing, the synchronization requirements are extremely tight. In such applications, not only is the maximum frequency deviation limited to 0.05 ppb, but the phase error between each Node B must be no worse than 5 µs. This translates to a worst case phase accuracy of ±2.5 µs at the input of each Node B. Since this timing specification is an absolute worst case limit, it is expected that the typical timing performance will be better than this value.

The test configuration shown in FIG. 6 is an example of a test configuration for evaluating the timing performance of an IEEE 1588 system serving multiple Node B IWFs 606 and 608 (Node B-1 and Node B-2), which are IEEE 1588 slave IWFs. In this configuration, two IEEE1588 PTI streams are generated by the primary IEEE 1588 Master (P) 602 and sent over the network via path 622 (links A, D, H, I) to the Node B IWFS 606 and 608. Background traffic can then be applied to each intermediate node 612, 618, 616, and 620 in order to generate a desired PDV stimulus. The resulting timing differences been each Node B IWF 606 and 608 can then be compared directly. In the event of a protection switch to the alternate IEEE 1588 Master (A) 604, a new path 624 is chosen (links B, C, F, H, and J) to the Node B IWFs 606 and 608. In this case, a different set of background traffic or PDV stimulus can be injected at nodes 610, 614, 612, 616, 618, and 620 in order to evaluate the ability of the Node B IWFs 606 and 608 to maintain phase synchronization during this transient event.

It is to be understood that the embodiments of the present invention illustrated in FIGS. 3-6 do not limit the present invention, but provide examples of how the system of the present invention for stress testing timing and synchronization in data packet networks can be applied to various types of equipment and algorithms.

FIG. 7 illustrates a method for adaptive timing recovery stress testing according to an embodiment of the present invention. At step 702, PTI streams are generated. As described above, one or more packet generators can be implemented as various types of IWFs, such as CES IWFs and TES/PNT IWFs. Such IWFs generate PTI streams by converting time division multiplex (TDM) signals to data packets.

At step 704, the packets in the PTI streams are transmitted along one or more paths through a group of nodes. The nodes can be implemented as packet switches or routers. As described above, the nodes can provide a connectionless network such that different packets in a PTI stream are transmitted along different paths through the nodes. In addition, packets following one defined path can be switched to flow over a different defined path to simulate network re-routing events.

At step 706, delays are generated for the packets at each of the nodes in the defined packet path for a packet. The delays can be generated by independently controlling background traffic generated at each node. The delays can be generated according to delay profiles specific to each node including either statistical profiles, deterministic profiles, or a combination of both. The delay profiles can specify desired PDV distributions for the packets transmitted through each node.

At step 708, the packets of the PTI streams transmitted through the nodes are received at DUTs. As described above, the DUTs can be implemented by various IWFs, such as CES IWFs, IEEE 1588 slave IWFs, etc. The actual PDV of the PTI streams can be measured at this point, and various types of analysis may be performed. For example, a probability density function (PDF) histogram can be constructed of the delayed packets. Other forms of analysis including time deviation (TDEV) and minimum time deviation (minTDEV) may also be performed as well.

At step 710, the packets received at the IWFs of the DUTs and the emulated services are tested. For example, the jitter, wander or frequency of the emulated services can be tested. The emulated services can be tested by converting the packets to TDM signals by the IWFs of the DUTs, and testing aspects of the TDM signals, such as jitter, wander, and frequency accuracy, are tested.

The configurations of FIGS. 3-6 and the steps of the method of FIG. 7 may be performed by one or more computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 8. Computer 802 contains a processor 804 which controls the overall operation of computer 802 by executing computer program instructions which define such operation. The computer program instructions may be stored in a storage device 812 (e.g., magnetic disk) and loaded into memory 810 when execution of the computer program instructions is desired. Thus, the operation of computer 802 is defined by computer program instructions stored in memory 810 and/or storage 812 and the computer 802 will be controlled by processor 804 executing the computer program instructions. Accordingly, computer program instructions for implementing the configurations of FIGS. 3-6 and the method steps of FIG. 7 can be stored in memory 810 and/or storage 812 and executed by processor 804 executing the computer program instructions. Computer 802 also includes one or more network interfaces 806 for communicating with other devices via a network. Computer 802 also includes input/output 808 which represents devices which allow for user interaction with the computer 802 (e.g., display, keyboard, mouse, speakers, buttons, etc.). One skilled in the art will recognize that an implementation of an actual computer will contain other components as well, and that FIG. 8 is a high level representation of some of the components of such a computer for illustrative purposes. One skilled in the art will also recognize that the functionality described herein may be implemented using hardware, software, and various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus for adaptive timing packet recovery stress testing, comprising:
    at least one packet generator configured to generate at least one packet traffic of interest (PTI) stream;
    at least one device under test configured to receive the at least one PTI stream; and
    a plurality of nodes coupled through a plurality of links between said at least one packet generator and said at least one device under test to route packets of the PTI stream between said at least one packet generator and said at least one device under test,
    wherein each of said nodes i) independently generates delays for packets routed through that node, each delay for a packet independently generated based on one or more delay profiles for each node, and ii) routes individual packets in the at least one packet stream over a unique path through said plurality of nodes and said plurality of links between said at least one packet generator and said at least one device under test;
    wherein the plurality of links provides multiple paths between said at least one packet generator and said at least one device under test through the plurality of nodes.

2. The apparatus of claim 1, wherein each node of the said plurality of nodes comprises one of a packet switch and a router.

3. The apparatus of claim 1, wherein the plurality of nodes comprises:
    an ingress node connected to said at least one packet generator;

an egress node connected to said at least one device under test; and a network section core connecting said ingress node and said egress node, said network section core comprising a plurality of intermediate nodes, each of said intermediate nodes connected to each other intermediate node to provide a plurality of paths through said network section core.

4. The apparatus of claim 3, wherein said plurality of links comprises a link directly connecting said ingress node and said egress node.

5. The apparatus of claim 1, wherein each node of said plurality of nodes is configured to support background traffic to generate delays for the packets that are routed through that node.

6. The apparatus of claim 5, wherein parameters of each node and background traffic on each node are independently controlled on each node.

7. The apparatus of claim 1, wherein said at least one packet generator comprises at least one interworking function.

8. The apparatus of claim 7, wherein said at least one interworking function comprises at least one of a circuit emulation service (CES) interworking function and a timing emulation services (TES)/packet network timing (PNT) interworking function.

9. The apparatus of claim 1, wherein said at least one device under test comprises at least one interworking function.

10. The apparatus of claim 1, wherein the delays generated by each node are generated based on delay profiles specific to each node.

11. A method for adaptive packet timing recovery stress testing, comprising:

generating, by a packet generator, at least one packet traffic of interest (PTI) stream;

transmitting packets of said at least one PTI stream through a plurality of nodes, wherein the plurality of nodes are coupled through a plurality of links between said packet generator and at least one device under test and wherein each packet in said at least one PTI stream is transmitted along a different path through the plurality of nodes and the plurality of links;

generating, independently at each of the plurality of nodes, delays for the packets in said at least one PTI stream at each of the plurality of nodes, wherein each delay for a packet is independently generated based on one or more delay profiles for each node; and receiving the packets of said at least one PTI stream at the at least one device under test.

12. The method of claim 11, wherein each node of the said plurality of nodes comprises one of a packet switch and a router.

13. The method of claim 11, wherein said step of generating delays for the packets in said at least one PTI stream at each of the plurality of nodes comprises:

generating background traffic at each of said plurality of nodes.

14. The method of claim 13, wherein said step of generating background traffic at each of said plurality of nodes comprises:

controlling the background traffic independently at each node in said plurality of nodes.

15. The method of claim 11, wherein said step of generating at least one packet traffic of interest (PTI) stream comprises:

converting at least one time division multiplex signal to said at least one PTI stream using at least one interworking function.

16. The method of claim 11, further comprising:

testing aspects of an emulated service at the at least one device under test.

17. An apparatus for adaptive packet timing recover stress testing, comprising:

means for generating at least one packet traffic of interest (PTI) stream; means for transmitting packets of said at least one PTI stream through a plurality of nodes, wherein the plurality of nodes are coupled through a plurality of links between said means for generating at least one PTI stream and at least one device under test and wherein each packet in said at least one PTI stream is transmitted along a different path through the plurality of nodes and the plurality of links;

means for generating, independently at each of the plurality of nodes, delays for the packets in said at least one PTI stream at each of the plurality of nodes, wherein each delay for a packet is independently generated based on one or more delay profiles for each node; and means for receiving the packets of said at least one PTI stream at the at least one device under test.

18. The apparatus of claim 17, wherein said means for generating delays for the packets in said at least one PTI stream at each of the plurality of nodes comprises:

means for generating background traffic at each of said plurality of nodes.

19. The apparatus of claim 17, wherein said means for generating background traffic at each of said plurality of nodes comprises:

means for controlling the background traffic independently at each node in said plurality of nodes.

20. The apparatus of claim 17, wherein said means for generating at least one packet traffic of interest (PTI) stream comprises:

means for converting at least one time division multiplex signal to said at least one PTI stream using at least one interworking function.

21. The apparatus of claim 17, further comprising:

means for testing aspects of an emulated service at the at least one device under test.

* * * * *